United States Patent [19]

Gadani

[11] 4,161,383
[45] Jul. 17, 1979

[54] MACHINE FOR CONTINUOUS PRODUCTION OF MOLDED ARTICLES

[76] Inventor: Carlo Gadani, Via A. Bonzagni 20, Milan, Italy, 20149

[21] Appl. No.: 902,742

[22] Filed: May 3, 1978

[30] Foreign Application Priority Data

May 25, 1977 [IT] Italy ................................ 23983 A/77

[51] Int. Cl.² ...................... B29C 17/00; B29C 23/00
[52] U.S. Cl. .................................. 425/302.1; 425/308; 425/373; 425/384; 425/394
[58] Field of Search ................ 425/363, 373, 383, 384, 425/394, 302.1, 308

[56] References Cited

U.S. PATENT DOCUMENTS

| | | | |
|---|---|---|---|
| 2,296,372 | 9/1942 | Smith et al. | 425/373 X |
| 2,328,909 | 9/1943 | Kilborn | 425/373 X |
| 2,526,318 | 10/1950 | Battin | 425/373 X |
| 2,848,751 | 8/1958 | Vernon | 425/302.1 X |
| 3,078,510 | 2/1963 | Rowe | 425/373 X |
| 3,284,849 | 11/1966 | Coleman et al. | 425/302.1 X |
| 3,399,425 | 9/1968 | Lemelson | 425/373 X |
| 3,541,216 | 11/1970 | Rochlis | 425/373 X |
| 4,009,981 | 3/1977 | Rosen | 425/384 X |
| 4,012,188 | 3/1977 | Lemelson | 425/373 |
| 4,056,346 | 11/1977 | Hayashi | 425/373 |

*Primary Examiner*—J. Howard Flint, Jr.
*Attorney, Agent, or Firm*—Amster, Rothstein & Engelberg

[57] ABSTRACT

A molding machine is provided which comprises a rotating male mold and a female mold formed of flexible elements running over rollers. The flexible elements forming the female mold along a length of their travel mate a peripherical segment of the male mold and are moved thereby. The laminate to be molded moves in between the male and female molds and is molded in accordance with the shape of the male mold. Means are provided for hardening the plastic laminate after it has been shaped while a cutting device is provided for cutting the moldings to a desired length.

10 Claims, 11 Drawing Figures

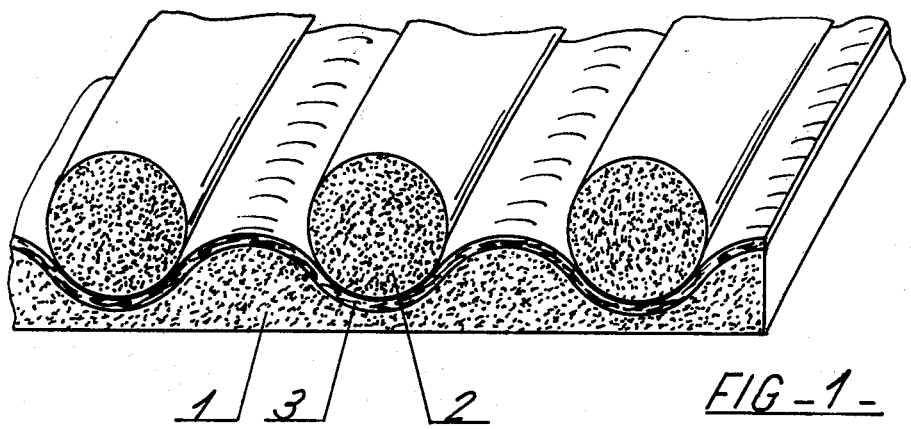
FIG-1-
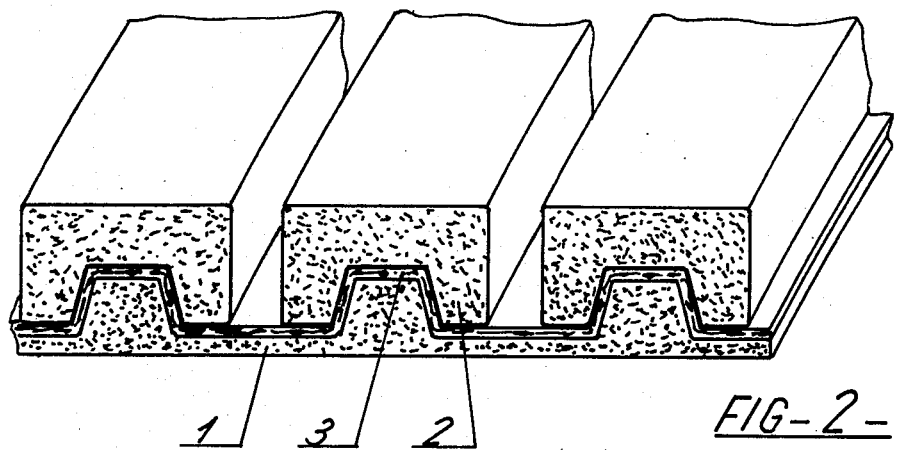
FIG-2-
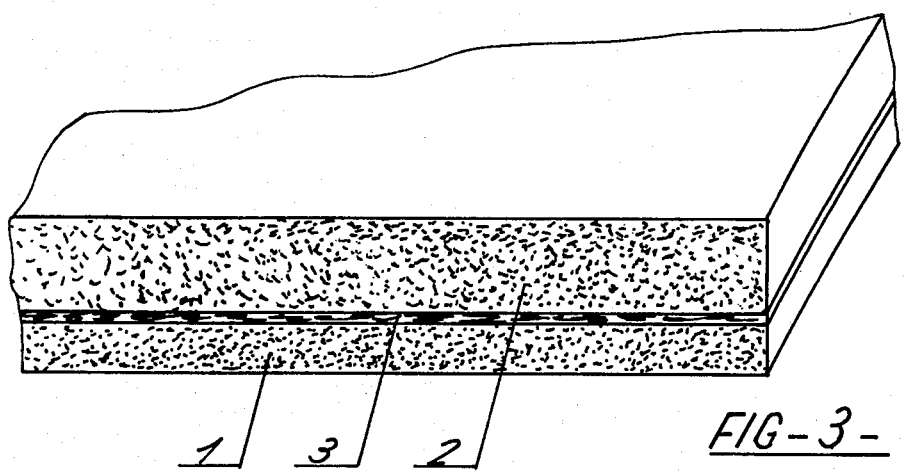
FIG-3-

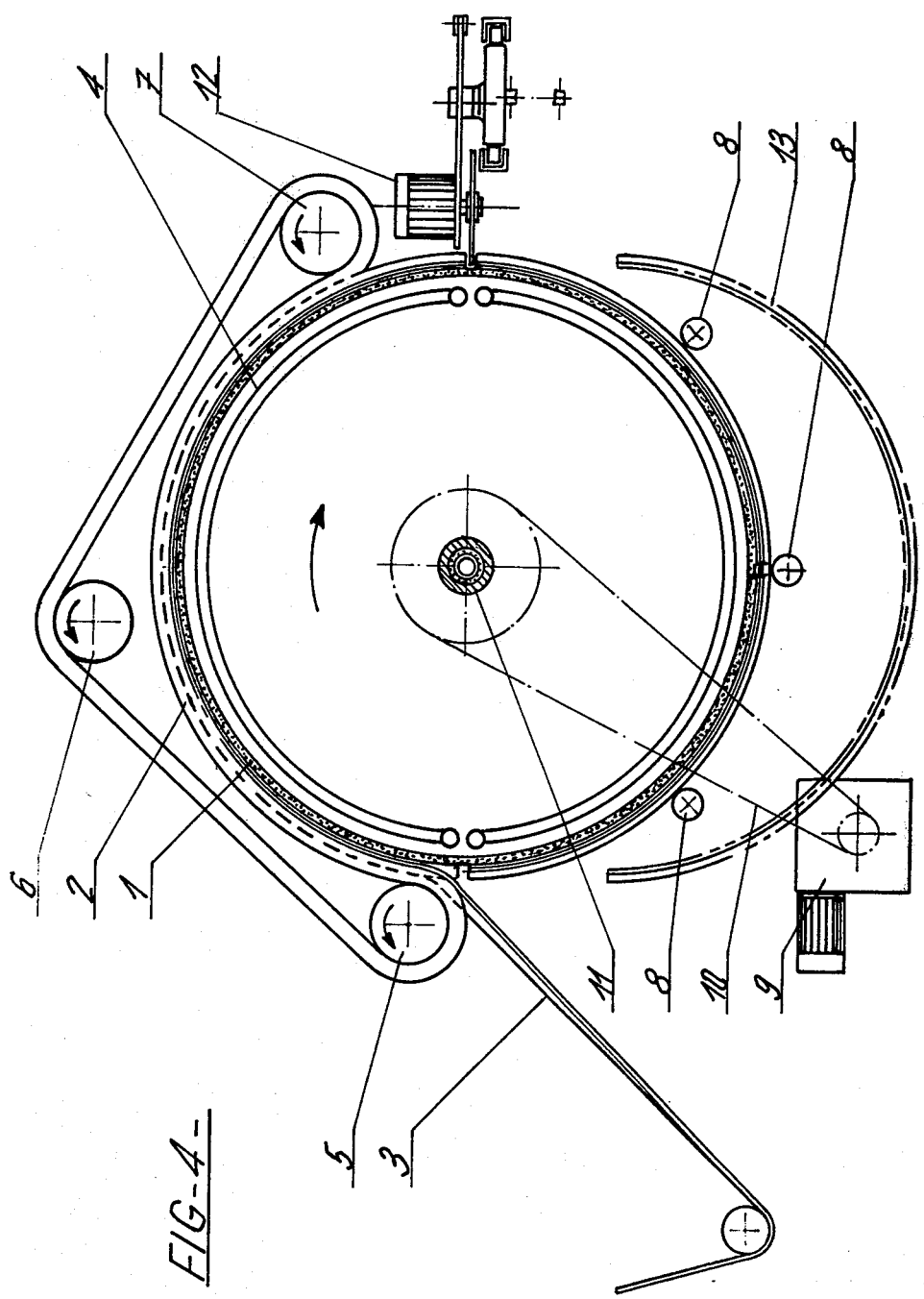

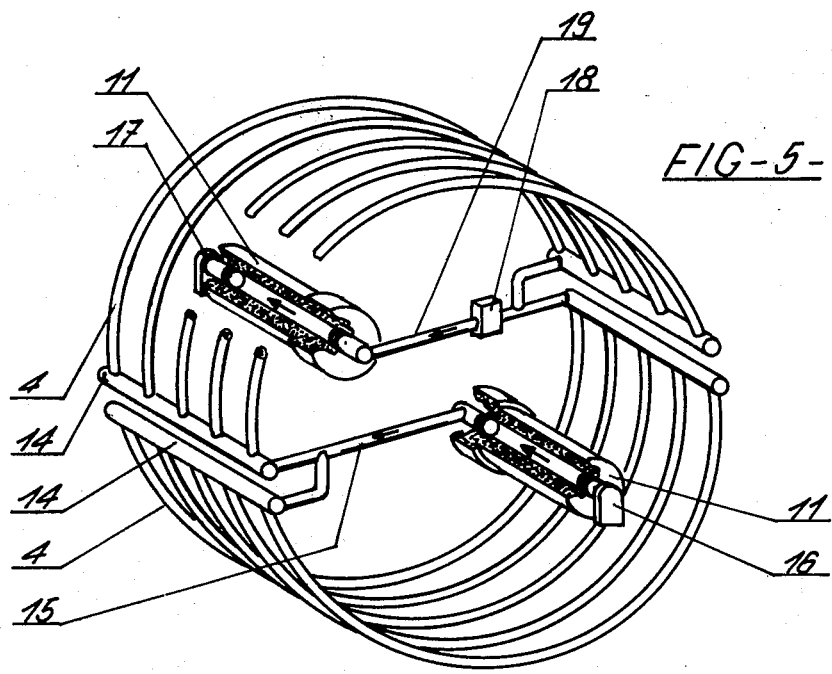
FIG-5-
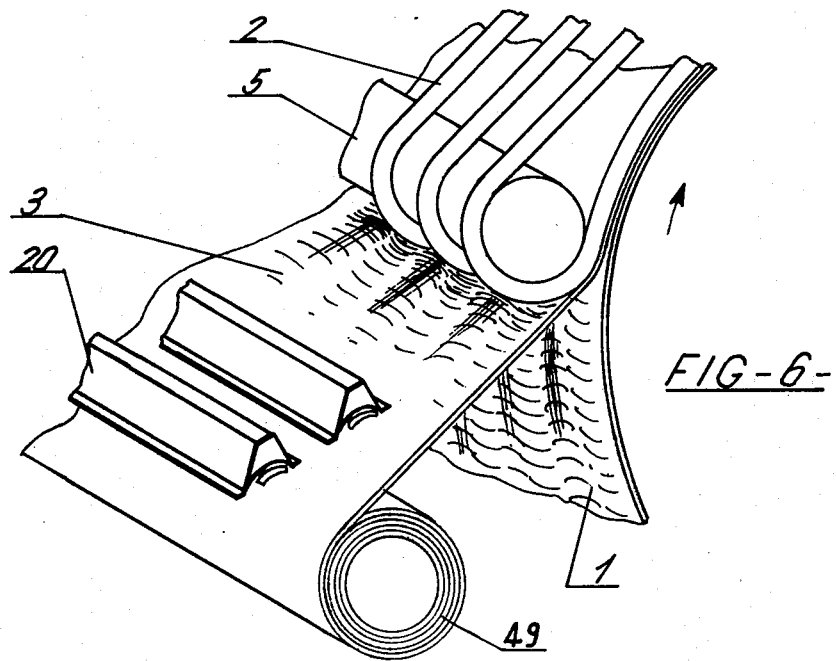
FIG-6-

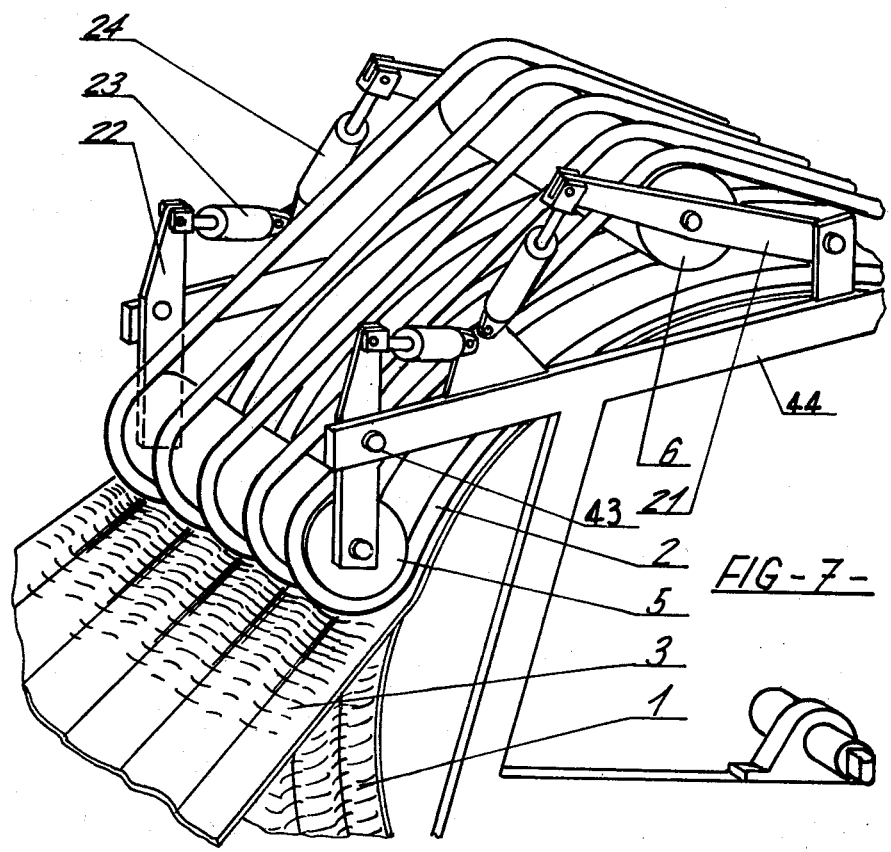
FIG-7-
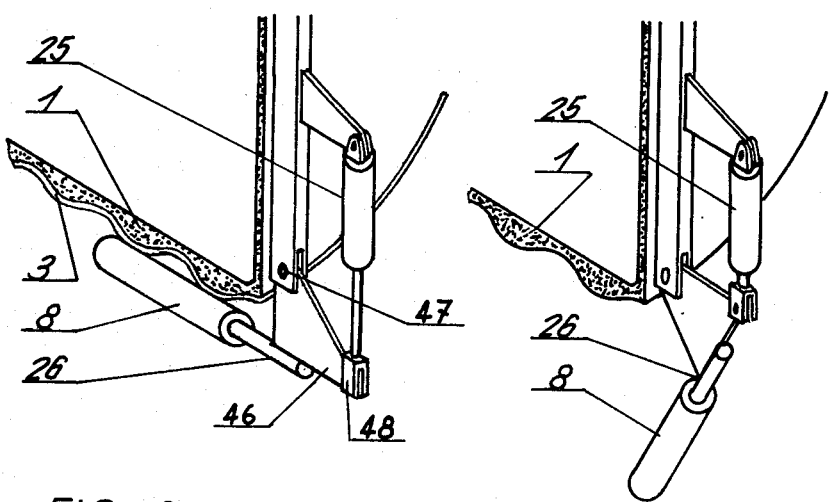
FIG-8-   FIG-9-

MACHINE FOR CONTINUOUS PRODUCTION OF MOLDED ARTICLES

This invention relates to a machine for the continuous production of articles formed of reinforced thermosetting resins or thermoplastic laminates.

The use of translucid and opaque articles formed of thermosetting resins reinforced with glass fibers or the like or of plastic laminates for use in building coverings, lanterns, sheetings of intradosses of tunnels in order to make the latter impermeable and the like is already known. However, heretofore a restraint on the use on a vast scale of such molded articles was their high production cost.

Further, for certain applications where these articles would have the possibility of a wide acceptance, such as agriculture, difficulties arose in the use thereof in that it was difficult to manufacture them in the shapes suitable for these applications. Therefore, at present for example, the protection systems of the vegetable and fruit cultivations are generally formed of metal or masonry structures covered by glass or plastic films, referred to as greenhouses or tunnels. A disadvantage of these protection systems is that the thermoplastic films are to be substituted every year due to obsolescence and also every time an unusual weather event occurs (hail, strong wind, frost) resulting in a large use of labor, dead times for repairs and damage to the cultivations when destroyed by the hail which eventually tears the thermoplastic film covering.

The invention aims to make less expensive the manufacture of the above mentioned plastic material articles and to facilitate their use in fields heretofore not very exploited, such as agriculture, by producing these articles in shapes, e.g. arcuated, which were heretofore difficult to obtain.

More particularly the object of the invention is to provide a machine for the continuous production of molded articles of reinforced thermosetting resins or thermoplastic laminates. In order to better understand the invention the term "laminate" will be employed throughout the description and claims to indicate both mats of glassfibers impregnated with resins and thermoplastic laminates. The machine according to the invention is characterized in that it comprises a rotatable male mold having in axial and cross-section a shape corresponding to that of the articles to be molded, a female mold formed of flexible elements in the form of endless belts or the like running over rollers, which belts mate along a length of their travel a peripherical segment of the male mold and are moved by the latter together with the laminate to be molded which moves in between the male and female molds and is molded in accordance with the shape of the male mold, said laminate being in the form of a band uncoiling from a stock roll and entering the machine in a plastic condition, means for hardening the laminate after it has been molded and a cutting device for severing the molded articles to a desired length.

The machine according to the invention permits the continuous production of articles having a curved, semicircular, semielliptic, saddle roof shape and so on with corrugated, fretted, flat and the like sections either with or without edges shaped for joining them to each other to form coverings of unlimited length, particularly for use in agriculture (protection and forcing tunnels) specifically expected for developing novel economical techniques for the protection and the forcing of the fruit and vegetable cultivations.

Articles obtained by means of the machine according to the invention are of practical and functional use, weatherproof also in the worst conditions. Further, they are inexpensive since they substantially reduce the present erection and maintainance costs due to their long life and the reduction of metal and masonry structures for supporting these coverings. These articles can be deemed as selfsustaining and indestructible by the weather conditions.

The invention will be better understood from the following detailed description of an embodiment thereof, given by way of example only and therefore not intended in a limiting sense in connection with the accompanying drawings, wherein:

FIG. 1 is a fragmentary axial section of a detail of the machine according to the invention, in the case of the molding of a laminate having a corrugated section;

FIG. 2 is a sectional view similar to FIG. 1, in the case of the molding of a laminate having a fretted section;

FIG. 3 is a sectional view similar to FIGS. 1 and 2, in the case of the molding of a laminate having a flat section;

FIG. 4 is a diagrammatic cross-section of the machine according to the invention;

FIG. 5 is a perspective view, partially in section, of the heating system of the machine of FIG. 4;

FIG. 6 is a fragmentary perspective view, in a larger scale than that of FIGS. 4 and 5, of a detail of the machine of FIG. 4;

FIG. 7 is a fragmentary perspective view, in the same scale as that of FIG. 6, of another detail of the machine of FIG. 4;

FIG. 8 is a fragmentary perspective view, also in the same scale as that of FIG. 6, of a further detail of the machine of FIG. 4.

FIG. 9 is a perspective view similar to FIG. 8, with some elements of the machine in a different operating position;

FIG. 10 is a fragmentary perspective view in the same scale as FIGS. 6 to 9, of a still further detail of the machine of FIG. 4; and FIG. 11 is a plan view of a detail of FIG. 10.

Referring first to FIGS. 4 and 5, it is seen that the machine shown therein comprises a male mold 1 having a circular shape in cross section and driven by a geared motor 9 through a chain driving 10 and rotating in the direction indicated by the arrow on hollow shafts 11 bearing on support members, not shown. Male mold 1 is continuously heated by means of heating elements 4, which will be described later. Laminate 3 in a plastic condition comprised of a mat of glass fibers or the like impregnated with thermosetting resins sandwitched between a pair of cellophane, terfan, paper or the like films or else of thermoplastic laminate (in this case the plastic condition is obtained by means of a preheating step) is inserted below the flexible elements forming a female mold 2 and accordingly molded in the shape of the male mold 1.

In FIGS. 1 to 3 there are shown three possible shapes of laminate obtainable by means of the machine according to the invention. More particularly, FIG. 1 shows a laminate having a corrugated shape in cross section, FIG. 2 a laminate having a fretted shape in cross section and FIG. 3 a laminate having a flat shape in cross section. Of course, various other shapes are possible. In the embodiment of the machine described herein it will be assumed that the laminate to be manufactured is of corrugated shape.

Flexible elements 2 are formed of endless belts (see FIGS. 6 and 7) running on rollers 5, 6 and 7. Roller 5 is movably mounted on support members 22 pivotally connected at 43 to the frame 44 of the machine and connected at one end thereof to pneumatic cylinders 23. These cylinders permit the lifting of the roller 5 and therefore the flexible elements 2 wound up thereon at the beginning of the working cycle for the insertion of the laminate 3 in between the rotating male mold 1 and the flexible elements forming the female mold 2. Roller 6 serves as a tensioning roller for the flexible elements 2 and is tensioned through the support elements 21, by the pneumatic cylinders 24 automatically actuated when the system is started. In this way roller 6 urges the flexible elements 2 against the rotating male mold 3. Roller 7 acts merely as an idler. Flexible elements 2 are moved together with the laminate 3 by the rotating male mold 1.

Figures 10, 11:
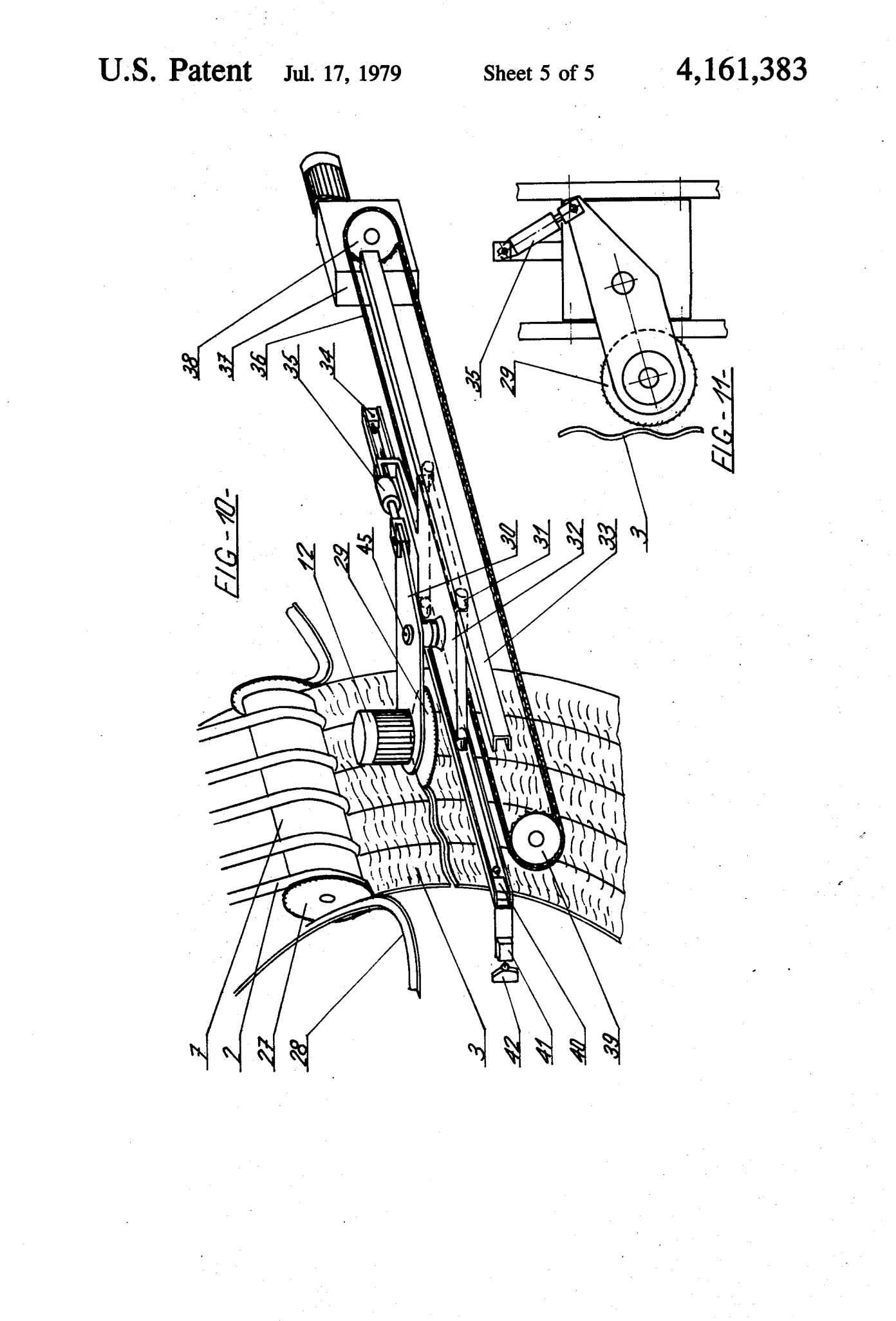

As it is apparent from FIGS. 4, 10 and 11, in a location diametrically opposed to the inlet of material 3 between the male mold 1 and the female mold 2 a powered transverse moving saw is provided for automatically cutting the manufactured article to the desired size. This powered saw comprises a sawing disc 29 driven by a motor 12 carried by a support plate 30 pivotally mounted at 45 on a carriage 32 sliding in transverse direction over rollers 31 and support guides 33, by means of a chain 36 driven by a pignon 38 which in turn is driven by a geared motor 37. Sprocket 39 acts merely as an idler. On the rotating male mold 1 cams 42 are mounted in a number equal to that of segments of the manufactured articles which are to be cut away from a complete article extending over 360°. In the described example cams are two in number so as to cut articles each extending over an arc of 180°.

In FIG. 5 there is shown a steam heating system comprising a tube bundle 4 in which steam is fed through headers 14. The steam is admitted through the hollow shaft 11 by means of a rotating valve 16 and the connecting tube 15. The condensate is exhausted from the connecting tube 19 in which a condensate discharging device 18 is inserted, through the hollow shaft 11' and the rotating valve 17. Of course, the heating system could be of a different type. For example, it could be operated by means of electrical power. It would be sufficient to this purpose to substitute the tube bundles with electrical immersion heaters again fed through one of the hollow shafts and provide a commutator instead of one of the rotating valves.

As it is seen from FIGS. 4, 8 and 9, below the rotating mold 1 support rollers 8 are provided which are intended to support the manufactured article before it is cut by the sawing device 12-29. These rollers are coated with a soft material so as to prevent the manufactured article to be damaged and are idle rollers and therefore freely rotating on a pivot pin 26. The latter is fastened to a gusset plate 46 pivotally mounted at 47 to the frame of mold 1 and at 48 to the piston rod of a pneumatic cylinder 25.

The heretofore described machine operates as follows:

It is to be pointed out that the machine serves to produce articles both from reinforced thermosetting resins and thermoplastic laminates. The operation of the machine in the case of production of articles from reinforced thermosetting resins will be first described.

A laminate 3 of glass fiber mat impregnated with a thermosetting resin, such as a polyester resin, sandwiched between cellophane or terplan or paper or the like films, is inserted between male mold 1 and female mold 2 with roller 5 being held lifted by means of pneumatic cylinder 23. Once one end of laminate is inserted roller 5 is again lowered and laminate pressed between male and female molds is brought in rotation by the male mold and moves in turn the flexible elements forming the female mold 2 causing them to run over rollers 5, 6 and 7. Flexible elements 2 by exerting a pressure on the laminate cause the latter to take the male mold shape, in the present case a corrugated shape.

During the rotation of the laminate, it is heated by the tube bundle 4 in which steam is flowing and resin hardens. As the laminate moves through the lower section of the male mold 1, it is supported by rollers 8 which are in the positions shown in FIG. 8. These rollers hold the article already molded in contact with male mold so that the article can be rotated by the male mold in spite of the article being no longer pressed against the male mold by the flexible elements 2. As the laminate has rotated through an angle of 360° one of the two cams 42 disposed in diametrally opposed positions on the male mold 1 actuates a switch 41 which, through a suitable device not shown, causes the following operations to occur:

(a) Stop of the rotational movement of the rotating male mold (b) Start-up of the powered saw 12-29

(c) Positioning of the saw in a cutting position by means of the pneumatic cylinder 35.

(d) Start-up of the geared motor 37 resulting in a transverse translation of carriage 32-saw 12-29 assembly and carrying out the cut. Once the cut has been carried out the switch 34 is actuated which again through a suitable device not shown, causes the following operations to occur:

(e) Stop and reverse movement of carriage and powered saw assembly through the reverse rotation of the geared motor 37

(f) Movement in an out-of-cut position of the powered saw 12-29 by actuation of pneumatic cylinder 35 (see FIG. 11)

(g) Stop of the saw motor (h) Start-up of rotation of the rotating male mold 1

(i) Retraction of rollers 8 supporting the article, which rollers move in the positions shown in FIG. 9. The severed article 13 being no longer supported by the rollers 8, falls onto a pallet-dolly, not shown, which serves to transport finished articles to the machine outlet.

The described operation is repeated until the stock material is exhausted.

If articles of plastic laminates are to be manufactured the operation of the machine must be slightly modified with respect to the described operation while remaining inaltered in its essential parts. Before the laminate enters in between the male and female molds, the laminate uncoiling for example from a roll 48 (see FIG. 6) is preheated by means of preheater elements 20 in order to bring it to a plastic condition. Further, for hardening the formed plastic article, instead of the heating system provided for thermosetting resins, it is necessary to provide a cooling system. It is also possible, however, to provide a single system which can operate at will either as a heating system or as a cooling system. Otherwise the operation of the machine is identical.

While an embodiment only of the invention has been described it is obvious that various changes and modifications can be made thereto without departing from the scope of the invention. More particularly the axial contour of the male mold 1 instead of being corrugated as in the described example, could be of another type, for example fretted as shown in FIGS. 2 and 3. Furthermore, the male mold instead of being of circular section could have another shape in section, e.g. a polygonal shape.

What I claim is:

1. A machine for the continuous production of molded articles of reinforced thermosetting resins or thermoplastic laminates, characterized in that it comprises a rotatable male mold having in axial and cross-section a shape corresponding to that of the articles to be molded, a female mold formed of flexible elements in the form of endless belts or the like running over rollers, which belts mate along a length of their travel a peripherical segment of the male mold and are moved by the latter together with the laminate to be molded which moves in between the male and female molds and is molded in accordance with the shape of the male mold, said laminate being in the form of a band uncoiling from a stock roll and entering the machine in a plastic condition, means for hardening the laminate after it has been molded and a cutting device for severing the molded articles to a desired length.

2. A machine as claimed in claim 1, characterized in that the machine is provided with a heating system for hardening the reinforced thermosetting resin articles molded by the machine.

3. A machine as claimed in claim 1, characterized in that the machine is provided with a cooling system for hardening the thermoplastic articles molded by the machine.

4. A machine as claimed in claim 1, characterized in that the machine is provided with preheating means for preheating the plastic laminate before it is engaged between the male and female molds.

5. A machine as claimed in claim 1, characterized in that one of the rollers on which the endless flexible elements forming the female mold run positioned at the inlet of laminate between the male and female molds is mounted on swinging supports under the action of a central device for lifting said roller away from the male mold so as to permit the end of the laminate to be inserted in between the male and female molds before the machine is started-up.

6. A machine as claimed in claim 1, characterized in that said male mold is provided with cam means for actuating said cutting device.

7. A machine as claimed in claim 1 characterized in that said cutting device comprises a powered saw mounted on carriage reciprocable in a direction of the male mold axis.

8. A machine as claimed in claim 7, characterized in that said powered saw is connected at one end of a lever pivotally mounted on said carriage and subjected at the other end to the action of a central device which controls the movement of the powered saw towards to and away from the molded article to be cut.

9. A machine as claimed in claim 1, characterized in that it comprises a plurality of rollers located below the male mold for supporting the article.

10. A machine as claimed in claim 9, characterized in that said rollers are retractably mounted under the action of a control device in order to let the cut article free of falling on a collecting device.

* * * * *